United States Patent [19]
Evangelista et al.
[11] Patent Number: 4,843,436
[45] Date of Patent: Jun. 27, 1989

[54] FEED ROLL CLEANER FOR CLEANING AND RENEWING THE FRICTIONAL FEEDING SURFACES OF THE SHEET FEED ROLLS IN A COPY REPRODUCING MACHINE OR PRINTER

[75] Inventors: Donato D. Evangelista, Webster; Eugene F. Horak, Victor; Bruce A. Winship, Rochester, all of N.Y.

[73] Assignee: Xerox Corporation, Stamford, Conn.

[21] Appl. No.: 760,008

[22] Filed: Jul. 29, 1985

[51] Int. Cl.[4] .............................................. G03B 27/00
[52] U.S. Cl. ................................. 355/133; 15/256.51; 271/37
[58] Field of Search ...................... 355/133; 15/256.51; 271/37

[56] References Cited

U.S. PATENT DOCUMENTS

| | | | |
|---|---|---|---|
| 984,273 | 2/1911 | Hebert | 271/37 |
| 1,742,070 | 12/1929 | Groves | 15/256.51 |
| 1,933,504 | 10/1933 | Martin | 15/256.51 |
| 2,352,040 | 6/1944 | Ungerer | 15/256.51 |
| 2,804,656 | 9/1957 | Purdy | 15/256.51 |
| 3,531,832 | 10/1970 | Whitehead et al. | 15/256.51 |
| 4,137,597 | 2/1979 | Achenbach et al. | 15/256.51 |
| 4,402,599 | 9/1983 | Seto | 355/77 |

OTHER PUBLICATIONS

Xerox Disclosure Journal, R. E. Smith & T. M. Krissel; "Photoreceptor Pumicing Method"; Nov./Dec. 1976, vol. 1, Nos. 11/12, p. 69.
Kinney, Ralph P., "Preparing for a New Finish", The Complete Book of Furniture Repair and Refinishing, Charles Scribner's Sons, 1981, pp. 108–109.
Mikesell, Arthur, The Popular Mechanics Home Book of Refinishing Furniture, Hawthorn Books, Inc., 1963, p. 71.

*Primary Examiner*—Monroe H. Hayes
*Attorney, Agent, or Firm*—Frederick E. McMullen

[57] ABSTRACT

Feed roll cleaner for cleaning and renewing the frictional surfaces of the paper feed rolls of a reproducing or printing machine having a relatively rigid lightweight rectangular board fittable within the machine paper tray in place of the copy sheets, the board having discrete patches of abrasive material on the surface thereof opposite the feed rolls such that on actuation of the machine, the feed rolls rub against the patch opposite thereto until the machine misfeed detector responds to the failure to feed a sheet and shuts down the machine.

6 Claims, 4 Drawing Sheets

FEED ROLL CLEANER FOR CLEANING AND RENEWING THE FRICTIONAL FEEDING SURFACES OF THE SHEET FEED ROLLS IN A COPY REPRODUCING MACHINE OR PRINTER

The invention relates to method and apparatus for cleaning the frictional surfaces of a sheet feeder, and more particularly to an improved cleaner pad and method of use.

In paper feeders such as employed to feed copy sheets in reproducing or copying machines, the feeding surface of the sheet feeding elements, which may for example comprise one or more feed rolls, often become contaminated with paper fibers, dirt, etc. over a period of time. Such contamination ordinarily changes to some degree the frictional relation between the feed rolls and the copy sheets being handled, interfering with the ability of the feed rolls to successfully and reliably feed the copy sheets. As a result, sheet misfeeds, jams, and the like occur. This in turn prompts a service call by the user or customer for the machine Tech Rep. who after diagnosing the problem typically will clean up the frictional operating surfaces of the feed rolls with a film remover. As a result, a relatively expensive and time consuming service call is required, during which the machine is out of use, to fix a relatively simple but obnoxious problem.

In this connection, devices for pumicing the surface of the photoreceptor in xerographic type reproduction or copying machines are known to the prior art as evidenced by the "Photoreceptor Pumicing Method" described in Vol. 1, Nos. 11/12 of the Xerox Disclosure Journal of November/December 1976 and in U.S. Pat. No. 4,402,599 issued on Sept. 6, 1983 to Seto. Each of these prior art disclosures describe the use of a flexible cleaning sheet which is placed in the paper tray and brought by the machine paper feeding mechanisms to the photoreceptor to pumice the same. In U.S. Pat. No. 4,402,599, the cleaning sheet is transported along the paper path and into contact with the machine photoreceptor at the transfer station by the sheet feeder. Thereafter, the cleaning sheet is discharged into the copy sheet output tray. In the arrangement discussed in the Xerox Disclosure Journal, the pumice sheet is of extended length so that one end can be fixed to the sheet tray leaving sufficient length for the other end to reach to the transfer station and the photoreceptor. The machine sheet feeder is used to bring the loose end of the pumice sheet to the photoreceptor, the latter being rotated so as to rub against the pumice sheet. Following completion of the pumicing process, the sheet is withdrawn.

In contrast to the prior art and in an effort to avoid the need for an expensive and largely unnecessary service call, the present invention provides a method for cleaning and renewing the frictional surface of a movable sheet feed member which feeds sheets from a sheet supply tray, comprising the steps of: removing the sheets from the supply tray; inserting a relatively rigid block-like piece having an abrasive surface in opposing relation to the feed member in place of the sheets in the supply tray; and actuating the sheet feed member to cause the member frictional surface to rub against the abrasive surface whereby to clean and renew the member frictional surface.

The invention further relates to cleaning means for cleaning the frictional feeding surface of a movable sheet feeding element of the type which engages the top sheet in a stack of sheets in a paper tray to feed the sheet from the tray, comprising: a generally rectangular relatively rigid boardlike member adapted for disposition in the paper tray in place of the sheets, and a patch of abrasive material secured to the side of the member opposite the sheet feeding element for engaging the sheet feeding element whereby on actuation of the sheet feeding element, the frictional feeding surface of the sheet feeding element rubs against the abrasive material to clean the frictional surface of the sheet feeding element.

IN THE DRAWINGS

The invention will now be described by reference to a preferred embodiment of the reproducing apparatus.

Figure 1:
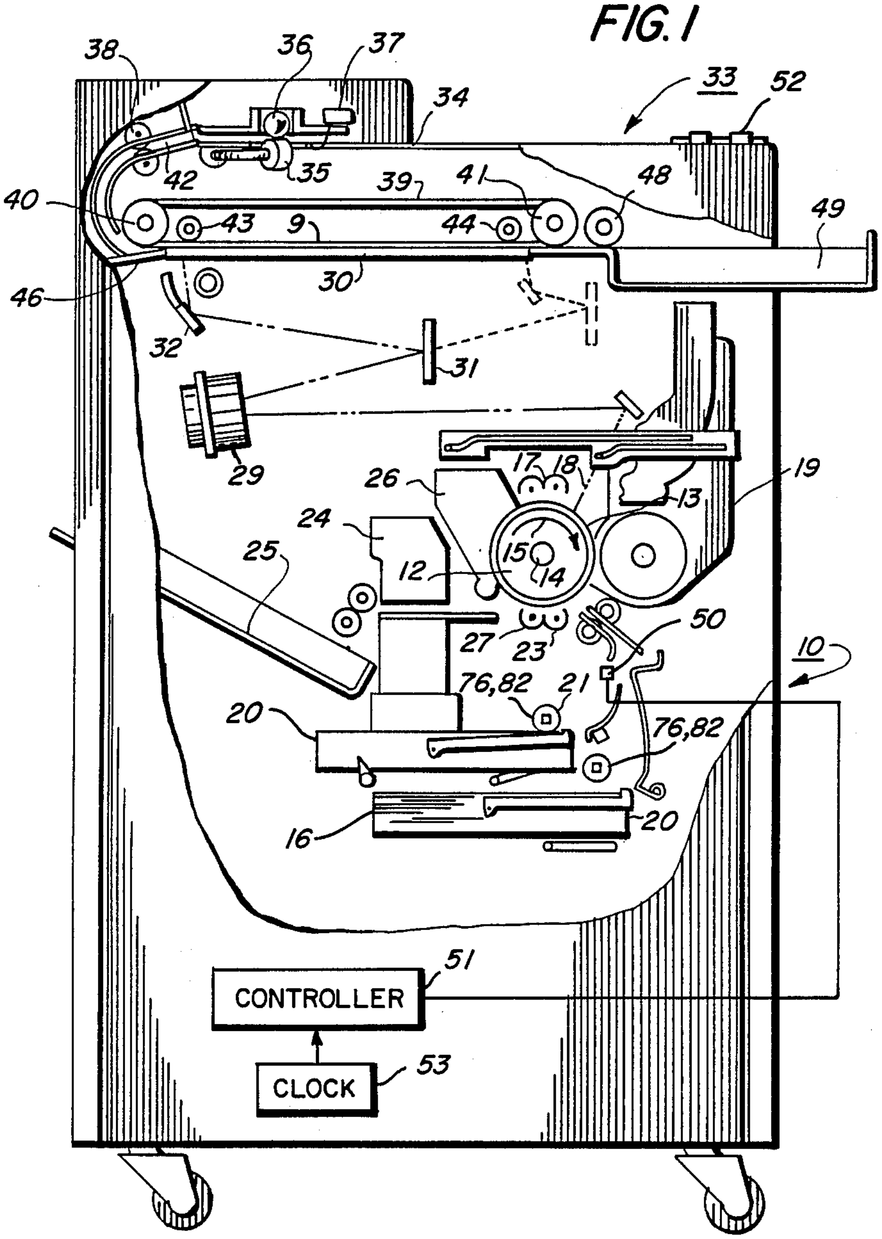
FIG. 1 is a schematic representation of a reproducing machine of the type with which the feed roll cleaner of the present invention is adapted for use.
Figure 4:
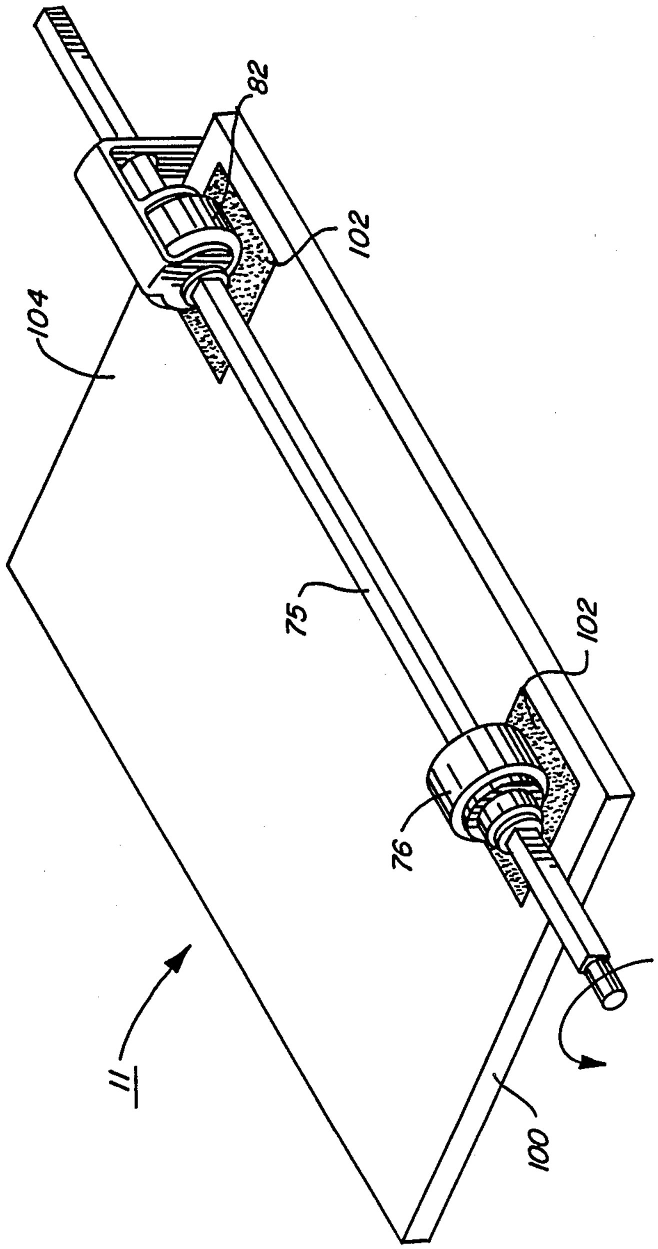
FIG. 4 is an isometric view showing details of the feed roll cleaner of the present invention.

Referring now to FIG. 1 there is shown by way of example an automatic xerographic reproducing machine 10 of the type with which the feed roll cleaner, designated generally by the numeral 11 and shown in FIG. 4, is used. The reproducing machine 10 depicted in FIG. 1 illustrates the various components utilized therein for producing copies from an original document 9. Although the present invention is particularly well adapted for use in an automatic xerographic reproducing machine 10, it should become evident from the following description that it is equally well suited for use in a wide variety of processing systems including other electrostatographic systems, other types of machines such as electronic printers, image output terminals, etc., and it is not necessarily limited in the application to the particular embodiment shown herein.

Reproducing machine 10 employs an image recording drum-like member 12, the outer periphery of which is coated with a suitable photoconductive material 13. The drum 12 is suitably journaled for rotation within a machine frame (not shown) by means of shaft 14 and rotates in the direction indicated by arrow 15 to bring the image-bearing surface 13 thereon past a plurality of xerographic processing stations. Suitable drive means which includes a motor 8 are provided to power and coordinate the motion of the various cooperating machine components to provide the desired number of copies of document 9 on a suitable support material such as copy sheets 16.

The practice of xerography is well known in the art and is the subject of numerous patents and texts including "Electrophotography" by Schaffert, and "Xerography and Related Processes" by Dessauer and Clark, both published in 1965 by the Focal Press.

During copying, the moving photoconductive surface 13 is uniformly charged at a charging station 17 in known manner preparatory to imaging. Thereafter, the charged photoconductive surface 13 is exposed to a light image of original document 9 at exposure station 18 whereby the charge is selectively dissipated in the light exposed regions to form an electrostatic latent image. After exposure, the electrostatic latent image recorded on the photoconductive surface 13 is carried to development station 19 wherein a conventional developer mix is applied to the photoconductive surface 13 of the drum 12 rendering the latent image visible. Typically a suitable development station could include a magnetic brush development system utilizing a magnetizable developer mix having coarse ferromagnetic carrier granules and toner colorant particles.

Sheets 16 are supported in a stack arrangement on a pair of elevating paper trays 20, 20'. With the stack of the selected paper tray 20 or 20' in elevated position, a sheet separater 21 feeds individual sheets therefrom to a sheet registration system 22. The sheet is then forwarded to the transfer station 23 in proper registration with the image on the drum where the developed image on the photoconductive surface 13 is transferred to the copy sheet brought forward. Following transfer, the copy sheet is transported through detack station where detack corotron 27 uniformly charges the sheet to separate it from the drum.

After the toner image has been transferred to the copy sheet, the sheet with the image thereon is advanced to a suitable fuser 24 which coalesces the transferred powder image thereto. After fusing, the sheet 16 is advanced to a suitable output device such as tray 25.

Any residual toner particles remaining on the photoconductive surface 13 after transfer are removed from the drum 12 at a cleaning station 26. There, the toner particles may be mechanically cleaned from the photoconductive surface 13 by any conventional means as, for example, by the use of a cleaning blade.

Normally, when the machine 10 is operated in a conventional mode, the original document 9 to be reproduced is placed image side down upon a horizontal transparent viewing platen 30 and the stationary original then scanned by means of a moving optical system. The scanning system fundamentally consists of a stationary lens system 29 positioned below the left hand margin of the platen as viewed in FIG. 1 and a pair of cooperating movable scanning mirrors 31, 32 which are carried upon carriages not illustrated. For further description and greater details concerning this type of optical scanning system, reference is made to U.S. Pat. No. 3,832,057 to Shogren.

Machine 10 is also provided with a document handler 33 which includes an input station, a copying sheet receiving slot 34, registration assist rolls 35, 36 and switch 37. When a document 9 is inserted, it makes switch 37 which activates registration assist rolls 35 and 36 which feed the document forward and align it against the rear edge guide of the document handler. The pinch rolls 38 are activated to feed the document around the 180° curved guides onto the platen 30. The platen belt transport is comprised of a single wide belt 39 having one run over the platen 30. The belt 39 is wrapped about two pulleys 40 and 41 which are arranged such that the belt surface at the bottom of the pulley with the assistance of input backup roll 43 and output backup roll 44 is in light contact with the platen. The document is driven by the belt 39 across the platen until the trailing edge of the document has cleared registration edge 46 after which the platen belt transport is stopped and the direction in which the document is driven is reversed so that it is registered against registration edge 46 and is now ready for copying. Once in position, the scanning optical system is activated and the document is scanned by full rate mirror 32. At the end of scan, the full rate mirror 32 and the half rate mirror 31 are in the positions shown in phantom in FIG. 1. After copying, the platen belt transport is driven off the platen by output rolls 48 into the document catch tray 49.

Suitable sheet feed/jam detectors such as sheet feed detector 50 are provided along the copy sheet feed path to detect any jammed or sheet feeding failures. Detector 50 is placed downstream of paper trays 20, 20' to detect whether or not a copy sheet 16 has been fed from the paper tray 20 or 20' in use during the copying process.

Machine 10 includes a suitable machine controller 51 for operating reproducing machine 10 in response to the copy program instructions input by the operator through the machine operator control panel 52. In addition, controller 51 receives machine operating information including inputs from sheet feed/jam detectors such as sheet feed detector 50. A machine clock 53 provides clock signals which are used by controller 51 to time and synchronize operation of the various machine components such as sheet feed rolls 76, 82 so that during a copy run, the sheet feed rolls 76, 82 of the selected paper tray 20 or 20' are actuated at the proper time to feed a copy sheet forward for transfer of the developed image from the photoconductive surface 13 at transfer station 23. Each time feed rolls 76, 82 are actuated, tolling of a timed interval in the form of a preset number of clock signals is commenced within which the leading edge of the copy sheet being fed is required to reach detector 50. Should a copy sheet fail to reach detector 50 within the timed interval, controller 51 intervenes to stop reproducing machine 10.

It is believed that the foregoing general description is sufficient for purposes of the present application to illustrate the general operation of an automatic xerographic copier or electronic printer 10 which can embody the present invention.

Figure 2:
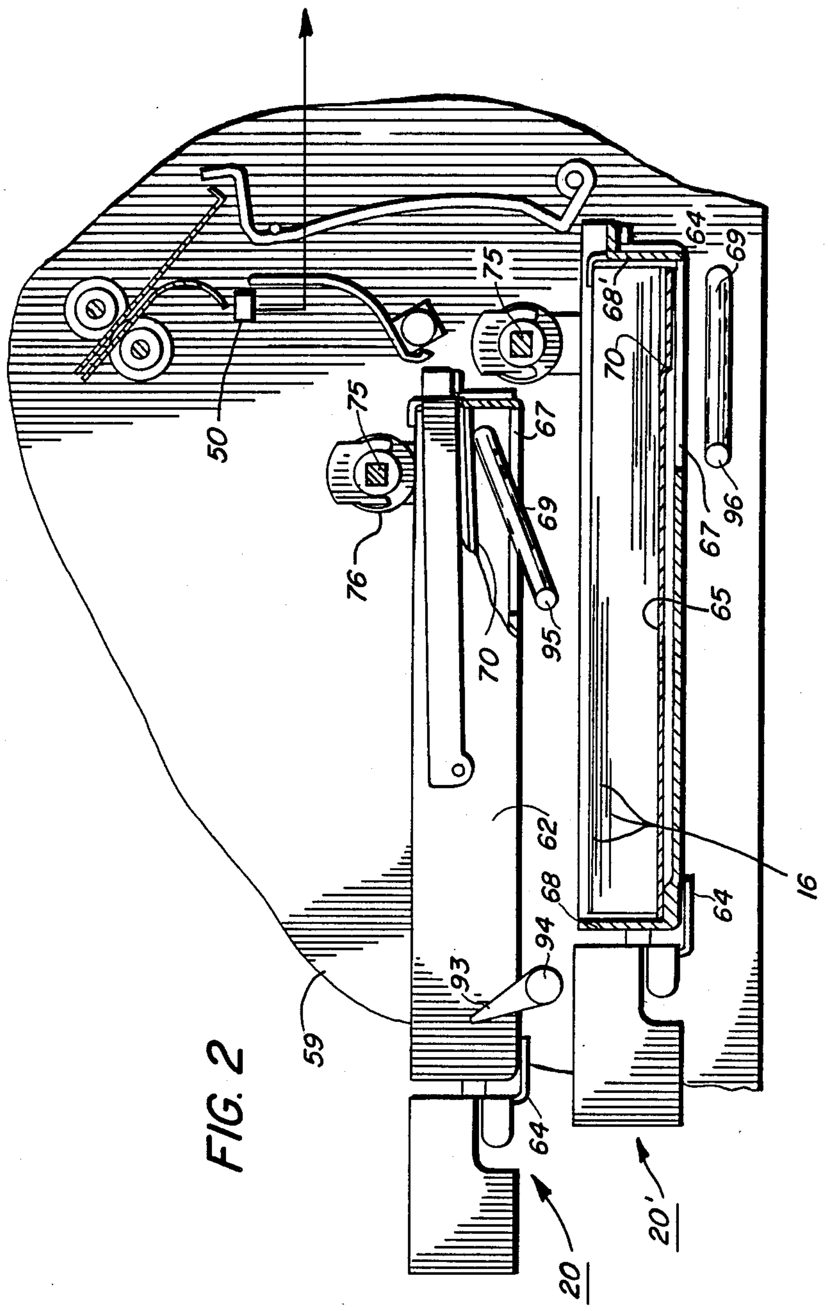
FIG. 2 is an enlarged view depicting details of the sheet feeding trays for the apparatus shown in FIG. 1.
Figure 3:
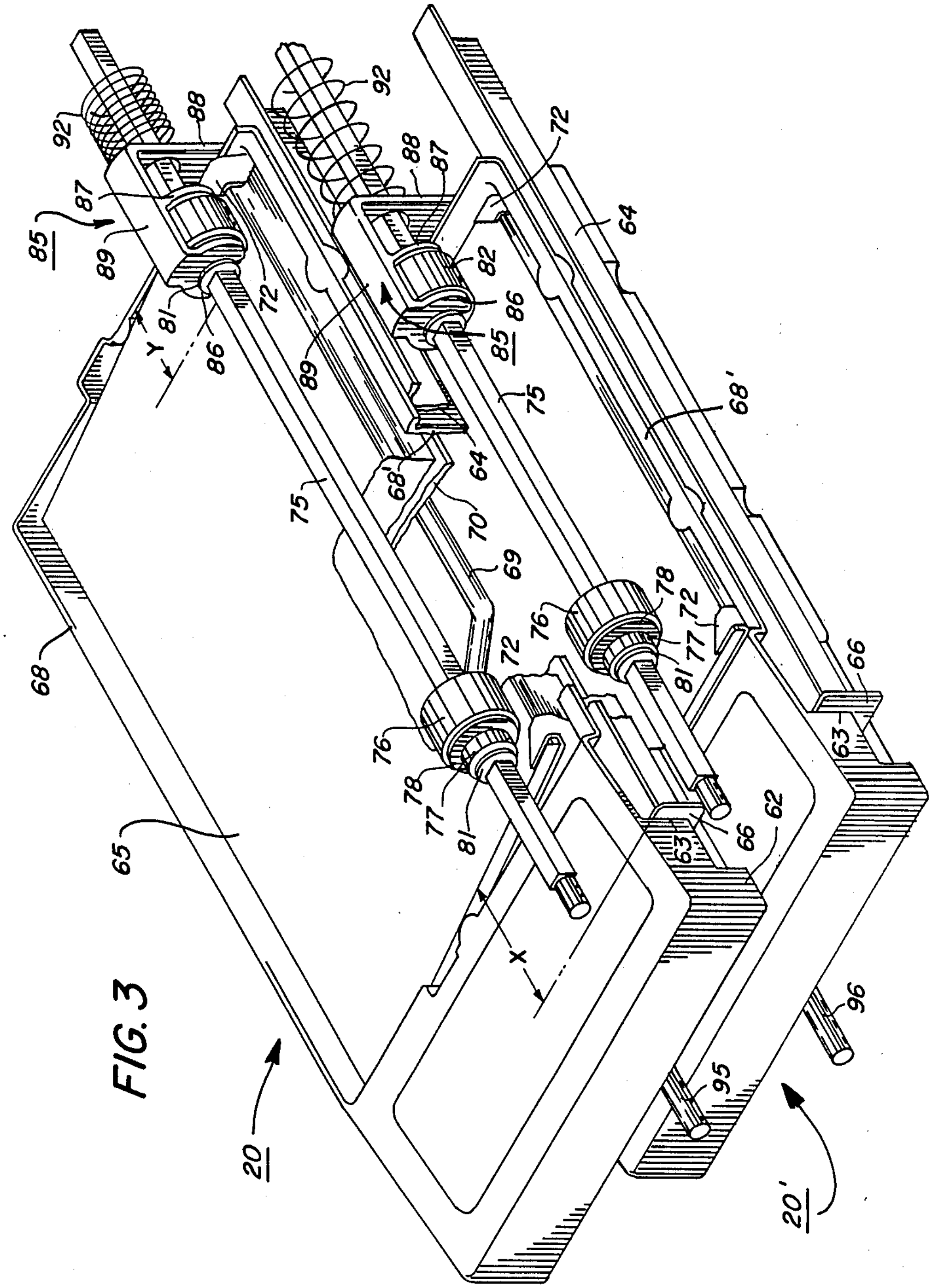
FIG. 3 is an isometric view of the sheet feeding trays shown in FIG. 2.

Referring now to FIGS. 2 and 3 wherein paper trays 20, 20' are shown in greater detail, each tray has a removable copy sheet cassette 62. Cassettes 62 are each singly mountable on a pair of guide rails 64 as they are inserted into the sheet supply cavity from the front of the copying machine. The guide rails 64 are each mounted at opposite ends in parallel machine frame members 59 with each cassette inserted until stop members 66 on the guide rails interrupt further travel of the cassette by engaging the stop member 63 of the cassette.

Cassettes 62 each comprise a generally box-like configuration with a sheet holding cavity 65 in the center surrounded by thin walls 68. The floor of the cassette has an aperture 67 through which a lifting tongue 69 lifts a tray 70 bringing the sheet supply into feeding engagement with the feed rolls as will be more fully described later. The tray 70 is pivoted about its sheet feeding trailing edge so that the sheet supply is raised up above the height of the wall 68 at the front of the cassette. Pivotally mounted on the side walls of the cassette are two arms with corner snubbers 72 on the other end of the arms. The snubbers are arranged to ride on the corners of a stack of sheets inhibiting the forward motion of the corners of the sheets when a sheet is fed in the forward position.

Feed roll shafts 75 which are suitably journaled in frame member 59 are generally square in cross section. Feed roll shafts 75 each have one feed roll 76 fixedly mounted in the axial direction to the shaft on a hub 77 mounted on shaft 75. An overrunning spring clutch 78 is mounted between the hub and the feed roll and the whole assembly is held in place with snap rings 81. The feed roll 76 is positioned a short distance in from the side of the paper supply. Typically, this distance is of the order of about two inches and may be maintained by aligning all cassettes whatever size sheet material they may accommodate such that the left hand edge of the cassette box is the same distance X from the end of the cassette to the stop members 66.

An axially movable feed roll 82 is provided at the opposite end of feed roll shaft 75, roll 82 being of the same construction as the fixed feed roll 76 in that roll 82 is also mounted on a hub having a round circumference and also has an overrunning clutch. Roll 82 differs from the fixed feed roll 76 in that roll 82 is axially movable on the feed roll shaft 75. Positioning of the movably mounted feed roll 82 on the feed roll shaft is achieved by means of yoke 85 which comprises two arms 86 and 87 axially mounted on shaft 75 positioned respectively on the two sides of the movable feed roll. The two arms are structurally linked together by support member 89 which also supports vertical positioning arm 88. Positioning arm 88 is sufficiently long to engage the side wall 68 of the associated cassette 62 as the cassette slides down the cassette guide rails 64 during insertion. Since the movable feed roll assembly is biased by means of axial spring 92, for example, toward the fixed feed roll, upon insertion of a cassette, the movable feed roll yoke 85 urges feed roll 82 in a direction away from the fixed feed roll 76. Once the sheet cassette is in position the spring continues to urge the yoke 85 toward the feed roll thereby insuring that the movable feed roll 82 is maintained in proper position. The distance "Y" is selected to provide positioning of the movable feed roll 82 the same distance toward the center from the outside edge as the fixed feed roll 76 is from the other edge of the copy sheet.

The use of two paper trays 20, 20' with individual cassettes and sheet feed rolls facilitates copying on different size sheets merely by selecting the cassette having the paper size desired. This is accomplished by means of selection lever 93 and lifting tongues 69. Rotating lever 93 in a counterclockwise direction rotates shaft 94 and through mechanical linkage (not shown) on the opposite frame member rotates lifting tongue shaft 95 counterclockwise. As shaft 95 is rotated, lifting tongue 69 is inserted into the aperture 67 of the cassette of the upper tray 20 thereby lifting the cassette tray 70 up so that the top sheet in the stack of copy sheets 16 therein is brought into engagement with feed rolls 76, 82 for tray 20. Rotating lever 93 in a clockwise direction rotates shaft 94 and through the same mechanical linkage, rotates the lifting tongue shaft 96 counterclockwise into the aperture of the cassette of the lower tray 20' thereby lifting the cassette tray 70 up so that the top sheet in the stack of copy sheets 16 therein is brought into engagement with feed rolls 76, 82 for tray 20'. In this manner only a single sheet cassette is maintained in feeding engagement with its respective feed roll.

In operation, a cassette is manually placed on the guide rail entrance and pushed down the guide rails 64 until the stop member of the cassette and rail abut each other. As the cassette slides down the rail the leading wall of the cassette engages the yoke positioning arm 88 moving it against the force of the spring bias 92 toward the opposite wall of the copying machine. As the yoke positioning arm moves, it urges the movable feed roll 82 also toward the opposite wall of the machine 10.

When the cassette is fully inserted, the fixed feed roll 76 and the movable feed roll 82 are both substantially the same distance from the respective edges of sheet material. To feed a sheet, the cassette lever is turned to engage the lifting tongue thereby raising the selected cassette tray and thereby the stack of sheet material into feeding engagement with the feed rolls. To feed a sheet, the feed roll shaft is driven clockwise to drive the topmost sheet forward.

Referring particularly to FIG. 4 of the drawings, feed roll cleaner 11 comprises a generally rectangular pad or base 100 with one or more abrasive strips 102 thereon. Abrasive strips 102 are preferably secured to the upper surface 104 of pad 100 by a suitable adhesive. Pad 100 is formed from any suitable rigid, lightweight material such as polystyrene, the dimensions and shape of pad 60 preferably being the same as that of the sheet holding cavity 65 of the paper cassette with which it is to be used to assure that pad 100 fits snugly and in desired operating position relative to feed rolls 76, 82 during cleaning. An abrasive strip 102 is provided for each feed roll 76, 82 of tray 20, the strips 102 being located on pad 100 so that when the cassette carrying pad 100 is inserted, there is a strip 102 opposite each of the feed rolls 76, 82. Abrasive strips 102 comprise any suitable abrasive material such as Brushlon Fiber, ‖,3-M Company.

In order to enable pad 100 to have a more universal application and accommodate various feed roll designs and locations, a series of strategically located abrasive strips 102 may be provided on pad 100. Alternately, the entire upper surface 104 of pad 100 may be covered with an abrasive material such as the aforementioned Brushlon fiber.

Operation

When it is desired to clean and renew feed rolls 76, 82 of paper tray 20 for example, the existing cassette 62 is removed from the tray. After clearing all copy sheets 16 from the cassette sheet holding cavity 65, feed roll cleaner 11 is inserted into the paper cassette with the side 104 of pad 100 bearing the abrasive strips 102 facing toward feed rolls 76, 82. The cassette with feed roll cleaner 11 therein is engaged with the guide rails 64 of tray 20 and the cassette slid into place. Selection lever 93 is rotated in a counterclockwise direction to lift the cassette tray 70 on which pad 100 of feed roll cleaner 11 rests, raising pad 100 to bring the abrasive strips 102 thereon into physical contact with the feed rolls 76, 82 of tray 20.

Machine 10 is then programmed to operate the feed rolls 76, 82 of paper tray 20. Where no special control is provided for this purpose, this is done by programming the machine for a copy run of one copy through operator control panel 52. As the copy run progresses, feed rolls 76, 82 of tray 20 are rotated in an attempt to feed the topmost copy sheet in tray 20 forward. The rotation of feed rolls 76, 82 causes the outer periphery of the rolls to rub or scrub against the abrading strip 102 opposite thereto to clean and renew the rolls.

Since there are no copy sheets 16 in the cassette for tray 20, sheet feed detector 50 fails to detect a copy sheet within the timed interval allotted for feeding. As a result, the machine controller 51 intervenes to stop reproducing machine 10.

The cassette 62 is then withdrawn from the tray 20 and pad 100 of feed roll cleaner 11 removed. Cassette 62 may then be re-filled with copy sheets 16 and replaced. The jam condition which prompted shutdown is cleared in accordance with standard operating procedures for reproducing machine 10.

Feed rolls 76, 82 of the second tray 20' are cleaned in the aforedescribed manner.

To enhance cleaning of the feed rolls and particularly to remove any film that accumulates thereon, a few drops of a liquid film remover such as isopropyl alcohol may be applied to the abrasive strips 102 prior to use of feed roller cleaner 11.

While the present invention has been shown and described in connection with a roll type paper feeders, feed roll cleaner 11 may be used to clean and renew other types of feeders such as belt, segmented roll, etc. Additionally, cleaning and renewal of the frictional feeding surfaces of the feed members of other types of paper or sheet handling devices such as document feeders using the feed roll cleaner of the present invention may be contemplated.

While the invention has been described with reference to the structure disclosed, it is not confined to the details set forth, but is intended to cover such modifications or changes as may come within the scope of the following claims.

We claim:

1. A method for cleaning and renewing the frictional surface of a movable sheet feed member which feeds sheets from a sheet supply tray, the steps which comprise:

(a) removing said sheets from said supply tray;

(b) inserting a relatively rigid stationary block like piece having an abrasive surface in opposing relation to said feed member in place of said sheets in said supply tray; and (c) actuating said sheet feed member to cause said member frictional surface to rub against said abrasive surface whereby to clean and renew said member frictional surface.

2. The method according to claim 1 including the steps of:

(a) terminating actuation of said sheet feed member after a preset interval;

(b) removing said block-like piece from said supply tray; and (c) reloading said supply tray with said sheets.

3. In a machine having a movable photoreceptor, means to charge the photoreceptor in preparation for imaging, exposure means for exposing the photoreceptor following charging to create a latent electrostatic image thereon, developing means for developing the latent image, at least one paper tray for holding a supply of copy sheets, sheet transport means for bringing one copy sheet at a time into transfer relation with said photoreceptor; transfer means for transferring the developed image from the photoreceptor to the copy sheet, and means for fixing the transferred image to provide a permanent copy, said sheet transport means including at least one sheet feed member for feeding said copy sheets from said tray, a method of cleaning the feeding surface of said sheet feed member comprising the steps of;

(a) clearing said copy sheets from said tray (b) substituting a relatively rigid stationary block having at least one abrasive surface in opposing relation to the frictional surface of said sheet feed member in said tray; and (c) actuating said machine to operate said sheet feed member whereby the frictional surface of said sheet feed member rubs against said abrasive surface to clean said frictional surface.

4. The method according to claim 3 including the step of:

after inserting said block, programming said machine to make at least one copy.

5. The method according to claim 4 including the steps of:

(a) monitoring the output of said paper tray to detect the failure of said sheet feed member to feed a copy sheet, and (b) shutting down said machine and terminating cleaning of said member feeding surface when failure of said feeder to feed a copy sheet is detected.

6. Cleaning means for cleaning the frictional feeding surface of a movable sheet feeding element of the type which engages the first sheet in a stack of sheets in a paper tray to feed said sheet from said tray, comprising:

a generally rectangular, relatively rigid board-like member adapted for disposition in said proper tray in place of said sheets, the length and width of said member being substantially equal to the length and width of said sheets, and plural patches of abrasive material secured to the side of said member opposite said sheet feeding element for engaging said sheet feeding element, said plural patches of abrasive material accommodating different locations of said sheet feeding element whereby on actuation of said sheet feeding element, the frictional feeding surface of said sheet feeding element rubs against said abrasive material to clean the frictional surface of said sheet feeding element.

* * * * *